US006641511B2

(12) United States Patent
Patel et al.

(10) Patent No.: US 6,641,511 B2
(45) Date of Patent: Nov. 4, 2003

(54) MOVABLE ARM ACTIVATED TOOL CHANGER FOR MACHINE TOOL SYSTEM

(75) Inventors: Himat Patel, Zionsville, IN (US); Walter Bautz, Griesheim (DE)

(73) Assignee: Hurco Companies, Inc., Indianapolis, IN (US)

( * ) Notice: Subject to any disclaimer, the term of this patent is extended or adjusted under 35 U.S.C. 154(b) by 0 days.

(21) Appl. No.: 10/084,570

(22) Filed: Feb. 27, 2002

(65) Prior Publication Data
US 2002/0115541 A1 Aug. 22, 2002

Related U.S. Application Data

(63) Continuation-in-part of application No. 09/652,935, filed on Aug. 31, 2000, now Pat. No. 6,494,821.

(51) Int. Cl.[7] ............................................... B23Q 3/157
(52) U.S. Cl. ........................... 483/1; 483/49; 483/54; 483/59
(58) Field of Search ................... 483/1, 49, 59, 483/38, 39

(56) References Cited

U.S. PATENT DOCUMENTS

| 3,339,273 A | | 9/1967 | Knosp | |
|---|---|---|---|---|
| 3,667,114 A | | 6/1972 | Smith et al. | |
| 3,844,028 A | | 10/1974 | Hague et al. | |
| 4,020,545 A | | 5/1977 | Slavinski et al. | |
| 4,087,901 A | | 5/1978 | Lohneis et al. | |
| 4,156,962 A | | 6/1979 | Haller | |
| 4,338,709 A | * | 7/1982 | Straub et al. ............... 29/26 A |
| 4,358,888 A | | 11/1982 | Zankl et al. | |
| 4,359,815 A | | 11/1982 | Toyoda | |
| 4,428,109 A | | 1/1984 | Seeger | |
| 4,523,367 A | * | 6/1985 | Burkhardt et al. ............ 483/59 |
| 4,587,716 A | | 5/1986 | Bytow | |
| 4,654,954 A | | 4/1987 | Bayes et al. | |
| 4,658,493 A | | 4/1987 | Saeki et al. | |
| 4,761,877 A | * | 8/1988 | Rupp ........................... 483/54 |
| 4,827,599 A | * | 5/1989 | Winkler et al. ............... 483/35 |

(List continued on next page.)

FOREIGN PATENT DOCUMENTS

| DE | 2525212 | 12/1973 |
|---|---|---|
| DE | 3336-232 | 4/1985 |
| DE | 19724635 | 12/1998 |
| DE | 29902127 | 6/2000 |
| EP | 0103956 | 3/1984 |

(List continued on next page.)

OTHER PUBLICATIONS

Copy of International Search Report for PCT Application No. US/01/2717 mailed on Mar. 28, 2002.

(List continued on next page.)

*Primary Examiner*—A. L. Wellington
*Assistant Examiner*—Dana Ross
(74) *Attorney, Agent, or Firm*—Baker & Daniels

(57) ABSTRACT

The present invention provides a tool changer for removal and installation of tools in a machining center having a spindle for holding a tool including a tool rack having a plurality of locations for holding tools and a rotatable arm movable between the spindle and the plurality of locations. Each of the plurality of locations has a clip for holding a tool and each clip has two arms with the arm on a first side of the clip having an inclined surface. The rotatable arm includes at least two grippers with each gripper defining at least one cam surface, the cam surface being structured and arranged to engage the inclined surface of the clip to allow for the removal of a tool in the clip.

20 Claims, 16 Drawing Sheets

U.S. PATENT DOCUMENTS

| | | | |
|---|---|---|---|
| 4,943,199 A | | 7/1990 | Hillen |
| 5,107,581 A | | 4/1992 | Reuter et al. |
| 5,142,766 A | | 9/1992 | Wehrmeister |
| 5,188,579 A | * | 2/1993 | Ruschle et al. ............ 483/1 |
| 5,267,766 A | | 12/1993 | Geissler |
| 5,281,194 A | | 1/1994 | Schneider |
| 5,749,819 A | | 5/1998 | Yan et al. |
| 6,007,464 A | | 12/1999 | Hashimoto |
| 6,071,220 A | | 6/2000 | Sugihara et al. |

FOREIGN PATENT DOCUMENTS

| | | | | |
|---|---|---|---|---|
| EP | 0974420 | | 1/2000 | |
| FR | 2465557 | | 3/1981 | |
| JP | 58-155141 | * | 9/1983 | ............ 483/59 |
| JP | 1-289633 | * | 1/1989 | ............ 483/59 |
| JP | 405261639 | | 2/1989 | |
| JP | 3-245939 | * | 11/1991 | ............ 483/59 |
| JP | 0045541 | | 10/1993 | |
| JP | 07060596 | | 3/1995 | |
| JP | 10080835 | | 3/1998 | |
| WO | 90/056616 | * | 5/1990 | ............ 483/59 |
| WO | WO 02/18094 A2 | | 3/2002 | |

OTHER PUBLICATIONS

Copy of International Search Report for International Application No. PCT/US02/35122 completed on Feb. 27, 2003.

* cited by examiner

MOVABLE ARM ACTIVATED TOOL CHANGER FOR MACHINE TOOL SYSTEM

CROSS-REFERENCE TO RELATED U.S. APPLICATION

This is a continuation-in-part application of a U.S. patent application Ser. No. 09/652,935, filed Aug. 31, 2000 U.S. Pat. No. 6,494,821.

BACKGROUND OF THE INVENTION

1. Field of the Invention

The invention relates to machine tool systems, such as machining centers, mills, and lathes. More particularly, the field of the invention involves mechanisms for replacing the tool and its associated holder in the spindle of a machine tool system.

2. Background Art

A typical computer numerically controlled (CNC) machine tool system includes a machining center having a tool changing mechanism. The mechanism removes a particular tool, including its respective holder, from the machining spindle and replaces it with a different tool and holder. With machining centers of this type, a plurality of machining operations is conducted, which can require a like number of different tools be positioned in the spindle. Thus, prior machining systems have included a plurality of tools available for on-demand usage.

In the development of modern machining centers, considerable focus has been placed on the tool changing mechanism, i.e., the device that extracts a particular tool and holder from the rack and places it within the operating spindle at the machining location. For instance, the automatic tool changer of U.S. Pat. No. 3,844,028 (Hague et al.) is exemplary of such automatic tool changing mechanisms.

The tools may be provided in a variety of forms. Typically, the tools are mounted on a movable component that is integrated into the numeral control system of the machining center. The movable component can then be controlled to move a desired tool to a pre-determined location to be extracted by the automatic tool changing mechanism. This type of tool storage and retrieval mechanism is shown in FIG. 1. In particular, magazine 10 includes a plurality of tool pockets 12 that are configured to firmly grasp a tool holder. Magazine 10 is a chain type mechanism in which tool pockets 12 are interconnected by drive chain 14, or similar pocket positioning mechanism, which is wound around hub 15 and is driven by a motor (not shown) under direction of the numeric control system or a manual system. In operation, drive chain 14 can be incrementally driven to position a specific tool pocket 12 at the tool changing location. Magazine 10 also includes housing 17 that surrounds and supports tool pockets 12, drive chain 14 and hub 15. FIG. 2 presents magazine 10 as it is connected and arranged with machining center 11.

SUMMARY OF THE INVENTION

The present invention is a tool changer with a movable arm that removes and inserts a tool from a stationary tool rack into the spindle of a machining center.

According to the present invention, the tool changer comprises a tool rack having a plurality of locations for holding tools, and an arm structured and arranged to be movable between the plurality of locations including a position which is capable of accessing a spindle of the machining center. Each of the locations further comprises a fork that has a plurality of prongs. The movable arm has two grippers, wherein one of the two grippers is disposed at an angle of about 90° relative to the other of the two grippers.

The present invention provides a tool changer for removal and installation of tools in a machining center having a spindle for holding a tool, including a tool rack having a plurality of locations for holding tools and a rotatable arm movable between the spindle and the plurality of locations. Each of the plurality of locations has a clip for holding a tool and each clip has two arms with the arm on a first side of the clip having an inclined surface. The rotatable arm includes at least two grippers with each gripper defining at least one cam surface, the cam surface being structured and arranged to engage the inclined surface of the clip to allow for at least of insertion and removal of a tool in the clip.

The present invention further provides a machining center including a machine having a spindle holding one of a plurality of tools, and a tool changer for removal and installation of the plurality of tools in the machine. The tool changer includes a tool rack having a plurality of locations, and a rotatable arm movable between the spindle and the plurality of locations. Each location holds a tool and has a clip for holding a tool with each clip having two arms and the arm on a first side of the clip having an inclined surface. The rotatable arm includes at least two grippers with each gripper defining at least one cam surface, the cam surface being structured and arranged to engage the inclined surface of the clip to allow for at least one of insertion and removal of a tool in the clip.

The present invention further provides a method of changing tools in a machining center having a tool changer with a rotatable arm for removing and placing tools in a spindle of a machine or a tool rack having locations for holding tools including providing at least two grippers on the rotatable arm with the grippers defining a cam surface, providing a tool holding device at each location on the tool rack with the tool holding device including two arms with one of the arms having an inclined surface, moving one of the grippers into engagement with the tool holding device, engaging the tool holding device arm having the inclined surface with the cam surface of the gripper, unlocking the tool holding device, and disengaging the tool holding device arm having the inclined surface from the cam surface of the gripper.

An advantage of the present invention is that the tool changer is more reliable than prior tool changers because of fewer parts in its assembly.

An advantage of the present invention is that the tool changer is lightweight and compact for handling and easy to adapt to a machining center with limited space.

Another advantage of the present invention is the faster time to change a tool in the spindle.

Another advantage of the present invention is that more tool racks may be easily added to the tool changer, therefore providing more tool storage and a larger variety of changing capability.

Other advantages and benefits of the invention can be readily discerned from the following written description and accompanying figures.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
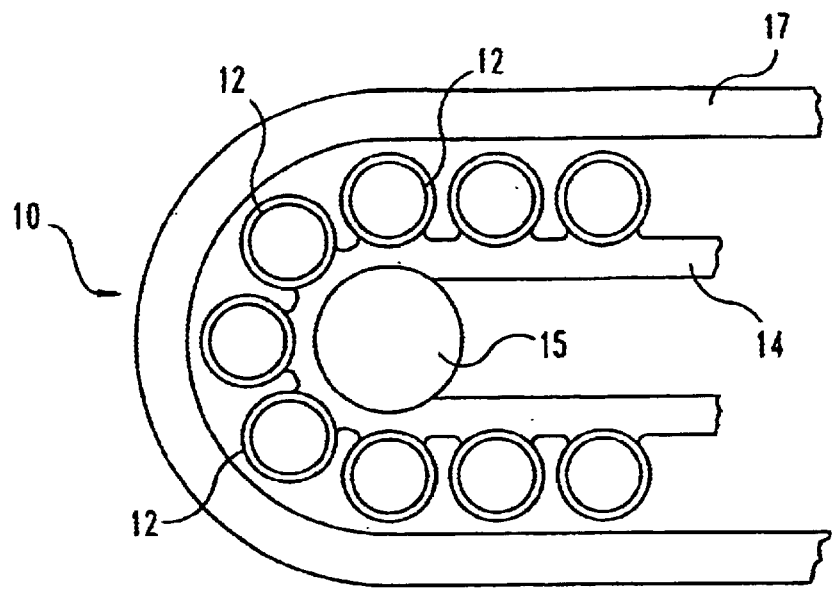
FIG. 1 is a side elevational view of a tool mechanism from prior art for an automatic machining center.
Figure 2:
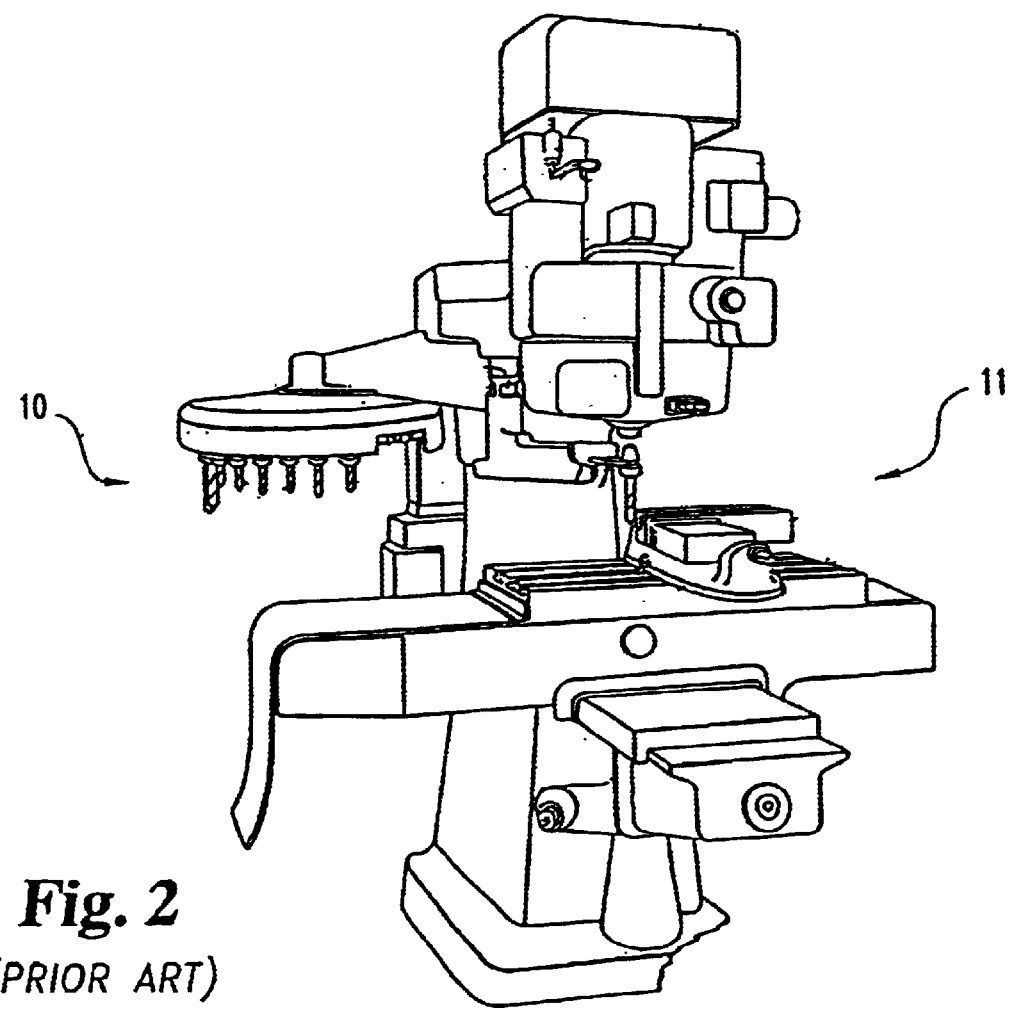
FIG. 2 is a perspective view of a vertical spindle milling machine using a tool mechanism of FIG. 1, viewed from the front and slightly to the left thereof.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention, in several forms, and such exemplifications are not to be construed as limiting the scope of the invention in any manner.

DETAILED DESCRIPTION OF THE INVENTION

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

Figure 3:
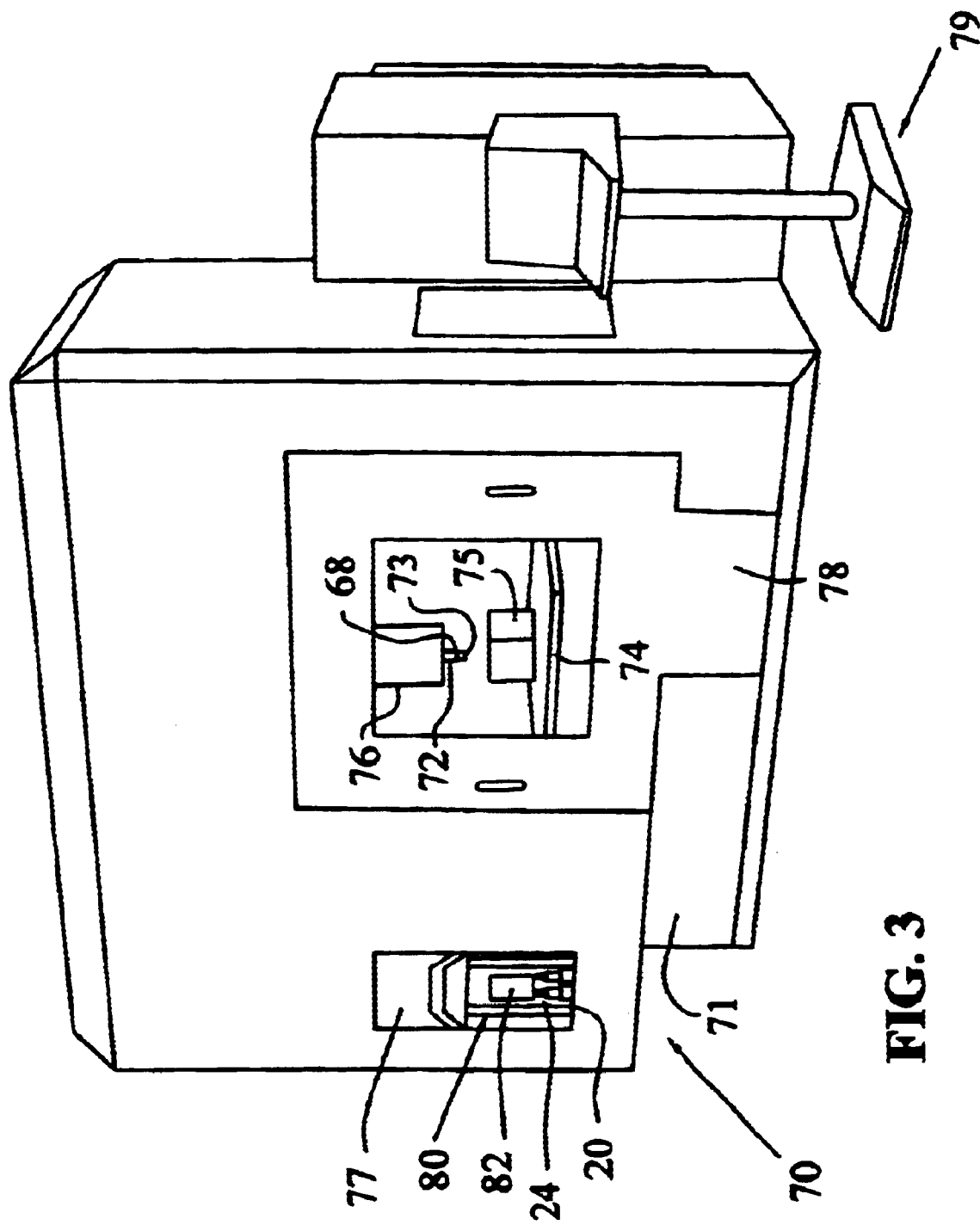
FIG. 3 is a perspective view of the movable arm activated tool changer inside a machining center according to the present invention.

FIG. 3 presents machining center 70 operably disposed within frame 71. Frame 71 contains debris within machining center 70. Machining center 70 includes spindle 72 capable of holding tool 73 for machining part 75. Table 74 is located inside machining center 70 and underneath spindle 72. Machining part 75 is placed on top of table 74 for machining, typically fastened to table 74 by hold down components (not shown). Spindle 72 is attached to main spindle motor 76 which provides the motive force for tool 73 to shape machining part 75. Screen and control panel 79, which is shown as a piece of stand alone equipment, is either built-in, moveable or on a swiveling arm fixed to the machine bed of frame 71. Tool changer 80 is installed inside frame 71 and access door 82 of tool changer 80 is adjacent door 77 of frame 71. Front side of tool changer 80 is shown with access door 82 which is for manual accessibility to tool changer 80 and exchange of tools 24 into or out of tool rack 20, including during the running time of machine center 70. It is to be noted that tools 73 and 24 include tool holders, as is known in the art, and that movement of such tools entails movement of the respective holders as well. Sliding door 78 is at the front of machining center 70 for enabling access to spindle 72, machining part 75 and machining area 110 (not shown in FIG. 3). Mechanical and electrical components are easily and comfortably accessible by access doors at the rear of the machine (not shown).

Figure 4:
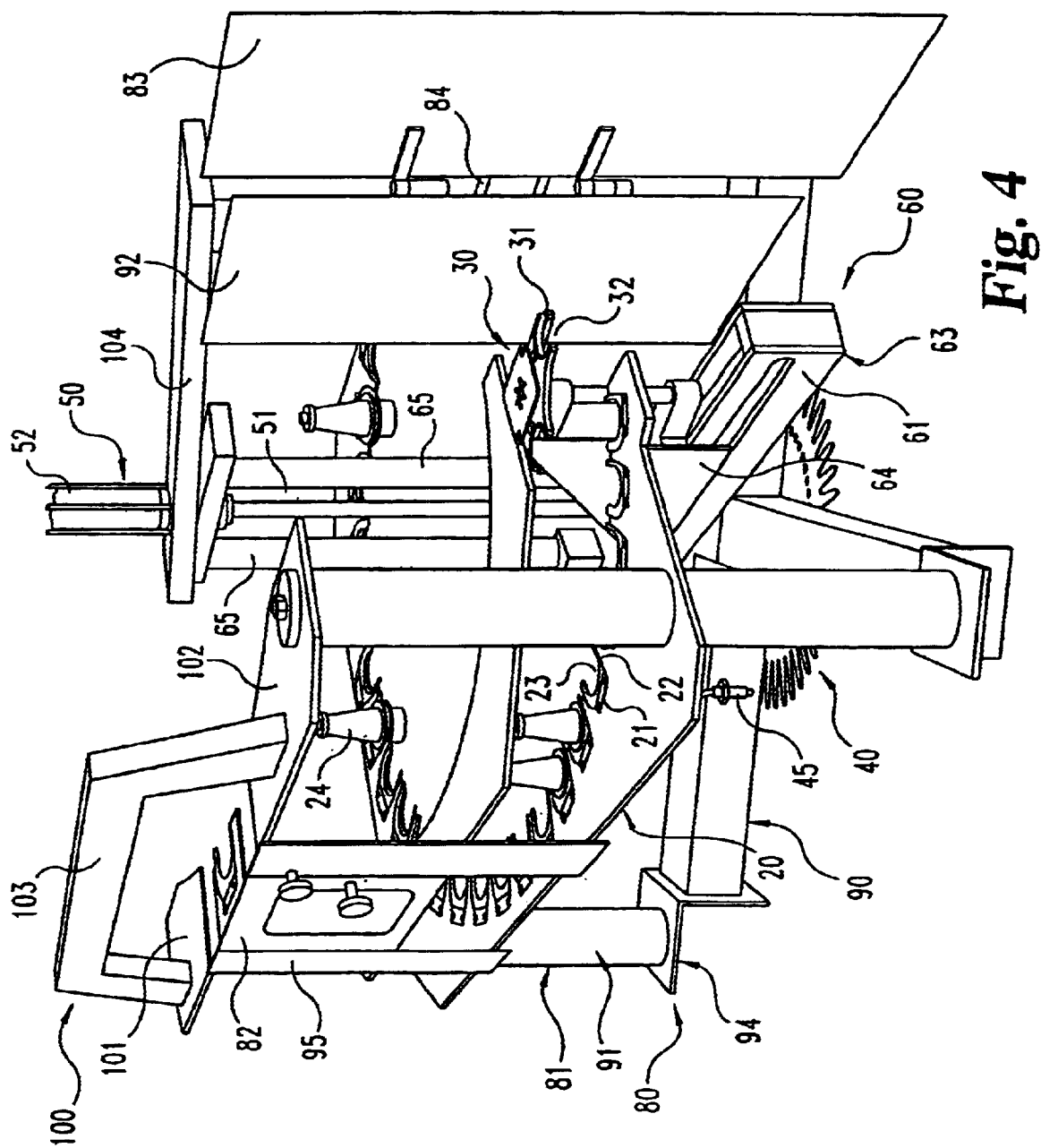
FIG. 4 is a perspective view of the movable arm activated tool changer of FIG. 3 showing with a number of tools on its tool rack according to the present invention.

As shown in FIG. 4, frame 81 of tool changer 80 is generally made of beams and columns assemblies. Frame 81 provides support for movable arm 30 and tool rack 20 and relatively positions movable arm 30 and tool rack 20, and anchors tool changer 80 within frame 71 (shown in FIG. 3), so that movable arm 30 can access tools on tool rack 20 and interact with spindle 72. The front of tool changer 80 is shown with access door 82. The bottom of frame 81 is generally made of an assembly of four beams 90 and provides stability for tool changer 80. Four beams 90 form an X-shaped beam assembly with one end of each beam 90 converged into one point which is the center of the bottom of tool changer 80. Three vertical columns 91, two columns 91 at front of tool changer 80 and one column 91 at the right hand of tool changer 80, are attached, for example by welding, to the bottom of tool changer 80 with each end of columns 91 being attached to the outer end of beam 90. The connection is accomplished by the use of angle plate 94 as a transition from horizontal beam 90 to vertical column 91. Tool rack 20 is sandwiched between column 91 as shown in FIG. 4.

Frame 81 also includes handle assembly 100 which is fastened to top end of two front columns 91, as shown in FIG. 4. Handle assembly 100 provides ease of transferring tool changer 80 in and out of machining center 70. Handle assembly 100 is generally made of handle 103 welded to two separated plates 101 and 102. Handle assembly 100 may be supplemented or replaced with additional tool rack 20 as shown in replacement in FIG. 10. The bottom of wall 92 is attached to a bottom beam 90, and the top of wall 92 is attached to bar 104, and the other end of which is attached to support and guide at the top of vertical mechanism 50. Cylinder actuated door 83 is hinged to one side of wall 92. Two bars 95 are fastened to tool changer 80 with top end of bar 95 to lifting handle assembly 100 and bottom end of bar 95 to edge of tool rack 20. One side of access door 82 is hinged to one of two bars 95.

Figures 11A, 11B:
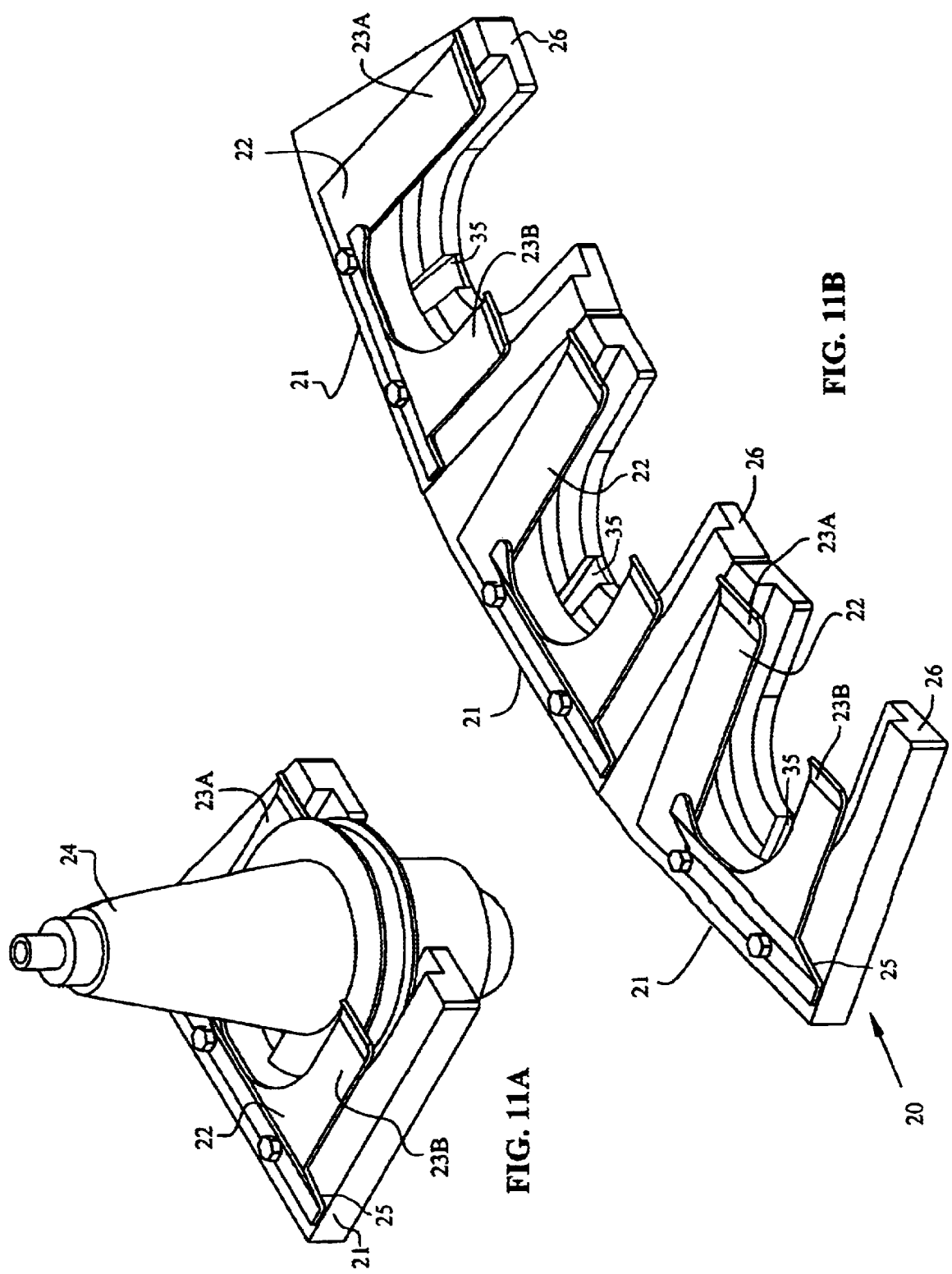
FIG. 11A is a fragmentary enlarged view of a tool location of the tool rack of FIG. 10.
FIG. 11B is a fragmentary enlarged view of the tool rack of FIG. 10.

Tool changer 80, for removal and installation of tools in machining center 70, comprises tool rack 20 having a plurality of locations 21 for holding tools. Movable arm 30 is structured and arranged to be moveable between the plurality of locations 21 and a position which is capable of accessing spindle 72 of machining center 70. Each location 21 includes U-shaped base portion 26 and a fork, or clip, 22 attached to base portion 26 with each fork 22 having a plurality of prongs 23, specifically, left and right prongs 23A and 23B, with each prong having slightly bent ends, as shown in FIG. 11. Each fork 22 has prong 23A which remains in a flattened state while the other prong 23B is being bent upwardly in the middle at inclined surface 25 such that bent prong 23B lies in a plane parallel to prong 23A. Movable arm 30 has two grippers, load gripper 31 and unload gripper 33, which are positioned at a 90° angle relative to each other. Grippers 31 and 33 each include two fingers 32A and 32B for gripping a tool. One finger 32B of each gripper has a cam 34 thereon which operates in conjunction with a fork 22 for either the removal or the placement of a tool in tool rack 20. In the tool removal operation, arm 30 moves to and under a fork 22, such that cam 34 on gripper finger 32B of load gripper 31 lifts prong 23B to unlock the tool from fork 22 for removal. Movable arm 30 is associated with rotational, vertical, and horizontal movement mechanisms described hereinbelow to allow for multiple levels of tool racks 20.

Prongs 23A and 23B of fork 22 are made from a material which has elastic properties such that prongs 23A and 23B may be manipulated by a cam on fingers 32A and 32B of gripper 31 to release a selected tool or gripper 33 for insertion of a tool. In the exemplary embodiment shown, prongs 23A and 23B are made from sheet metal. Alternatively, prongs 23A and 23B may be made from a durable plastic material. Forks 22 on each tool rack 20 have the same structure and orientation, or the bent prong 23B is located on the same side of the clip. However, clip 22 located on manual access door 82 is orientated 180° opposite that of other clips 22. For example, if clips 22 on tool rack 20 have prong 23B located on the left side thereof, then clip 22 at manual access door 82 has prong 23B located on the right side thereof. This reversed structure facilitates the operator manually placing a tool in the access door location which may then be removed by the tool changer and placed in a tool rack location.

Figure 12:
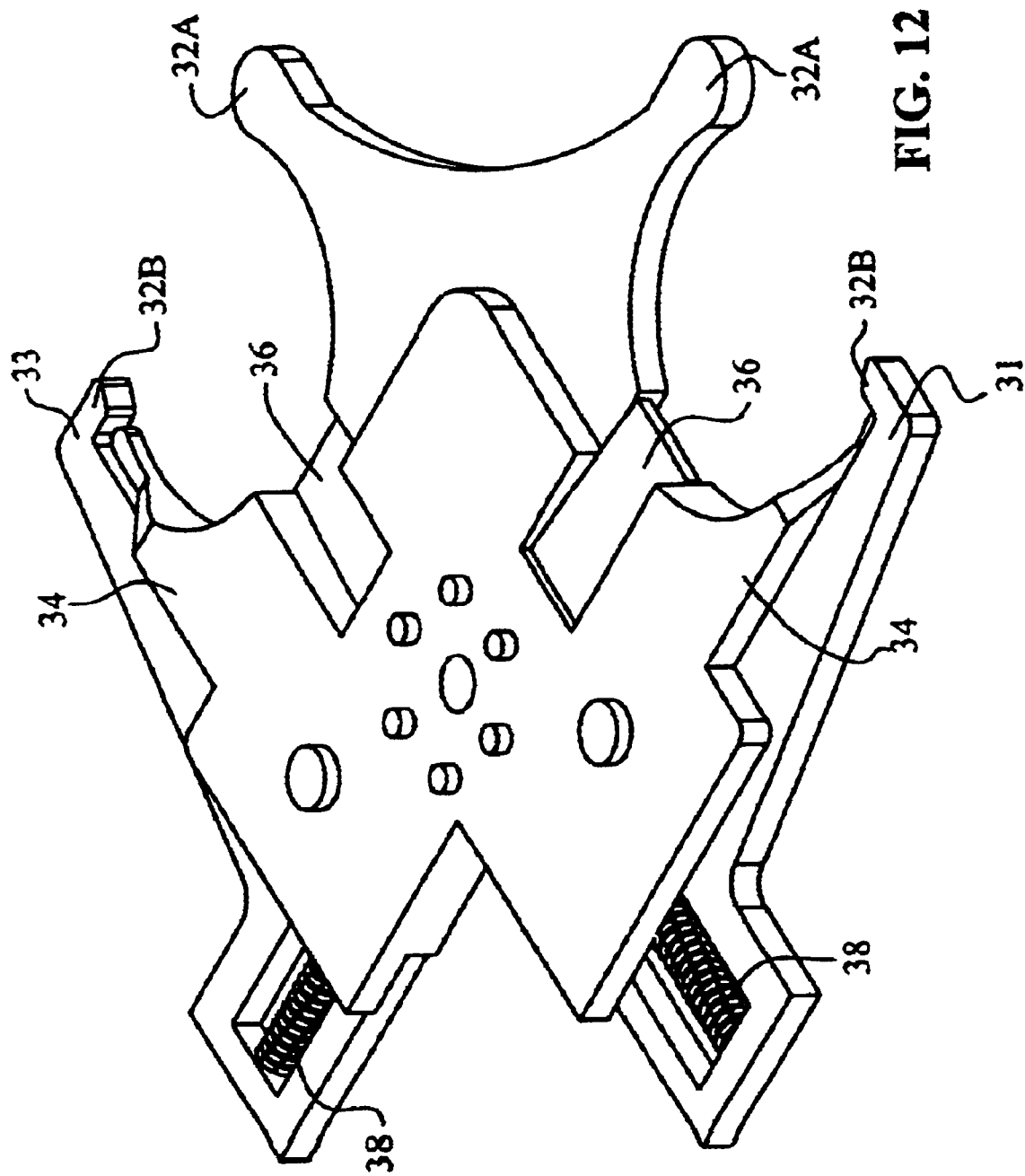
FIG. 12 is an enlarged fragmentary view of the gripper of FIG. 8, the gripper being shown as empty.
Figure 13:
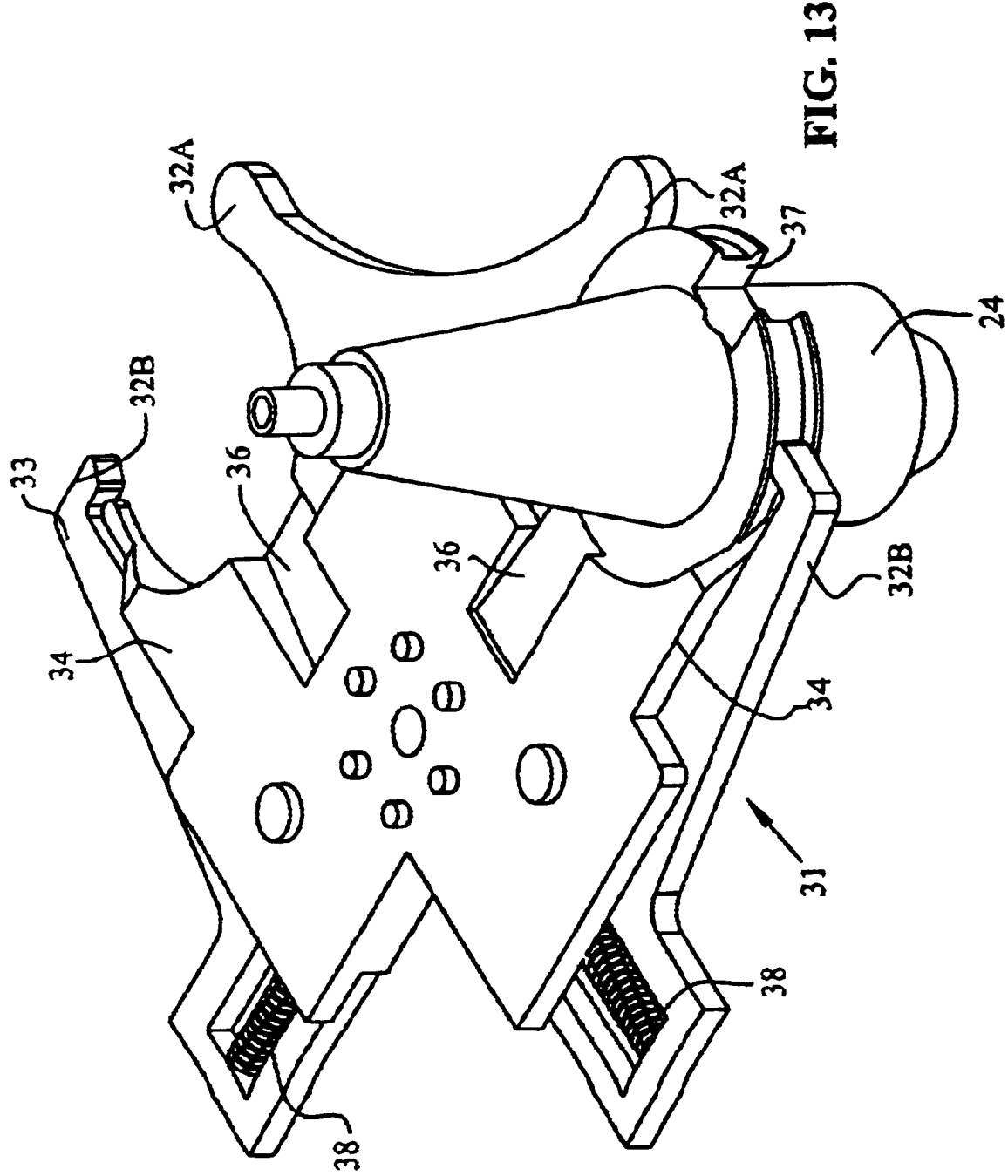
FIG. 13 is an enlarged fragmentary view of the gripper of FIG. 8, the gripper being shown as having a tool therein.

Referring to FIGS. 12 and 13, the end portion of rotatable arm 30, or the portion having grippers 31 and 33 is shown. In addition to cam 34, each gripper includes key 36 and a spring 38 disposed 180° opposite the gripper. Key 36 is provided to allow for correct positioning of tool 24 or tool 73 in gripper 31 or 33 such that the tool will be correctly aligned in spindle 72 or tool location 21 via keyway 37. Since grippers 31 and 33 would be unable to grip a tool without having an ability to expand and contract, spring 38 is provided. Spring 38 biases a gripper in its closed position, or the position in which no tool is held, but yet allows a gripper to expand slightly to receive a tool while maintaining a tensile force on the gripper such that the gripper has a tight grip on the tool. As shown in FIG. 13, tool 24 is gripped within load gripper 31 and since a tight grip is maintained, tool 24 may easily be moved from tool rack 20 to spindle 72, as described hereinbelow.

Also included at each tool location 21 is key 35, similar to key 36 on grippers 31 and 33, which may be used to align each tool when in a tool location 21 such that the tool would be properly aligned in gripper 31 when removed. As a result, no rotation of the tool is needed since the keyway on tool 24 is already in the proper position for engagement with key 36 on gripper 31. Alternatively, a pin may be utilized in place of the key and keyway structure described herein.

Sensors may be included in grippers 31 and 33 such that a tool can be detected, thereby providing an indication that a tool is being held in one of the grippers. Alternatively, sensors could be included to detect opened fingers on the grippers, thereby providing an indication that a gripper or both grippers are empty.

It is to be noted that tools 24 and 73 as well as other tools maintained within tool locations 21 on the tool rack 20 are of a standard design and configuration. Utilizing standardized tools eliminates the need for specialized parts or operations of the tool changer. Key 36, described above, locks into a standard keyway provided on the tools for positioning. Thus, several excess elements and steps are removed from the tool changer and tool change process by using standardized tools.

Figure 5:
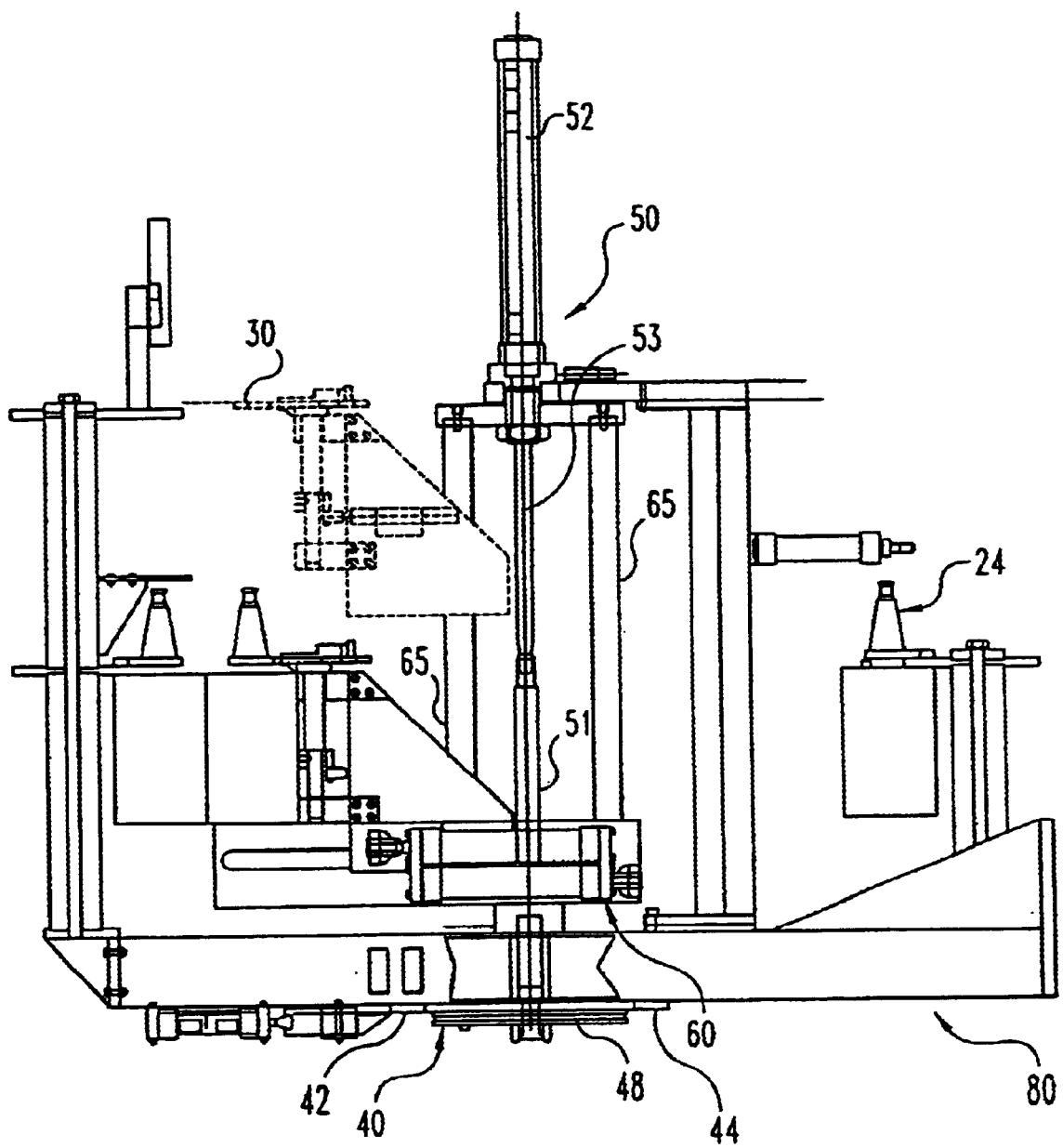
FIG. 5 is a side view of the movable arm activated tool changer showing vertical movement of the movable arm according to the present invention.

Movable arm 30 is associated with rotational mechanism 40 as shown in FIGS. 4, 5, 6a & 6b. Rotational mechanism 40 includes motor 41 which one end is attached to adapter 46. Adapter 46 is then attached to an ear 47 which is affixed to the bottom of tool changer 80. Adapter 46 has pulley 42 as shown in FIG. 5, which is rotated by the turning of the shaft of motor 41. Pulley 42 is attached to the motor 41 at one end of belt 43. The other end of belt 43 is attached to pulley 48 of gear wheel 44. Gear wheel 44 is attached to the bottom of tool changer 80 and is rotatable about its center. The center of gear wheel 44, in this exemplary embodiment, is coincident with the center of tool rack 20. However, because of the ability of arm 30 to move in several directions, rotational mechanism 40 may be located in other locations relative to tool rack 20. Gear wheel 44 is generally disposed in a central position within tool rack 20. The surface of gear wheel 44 is in a generally perpendicular orientation relative to vertical shaft 51.

Figure 6A:
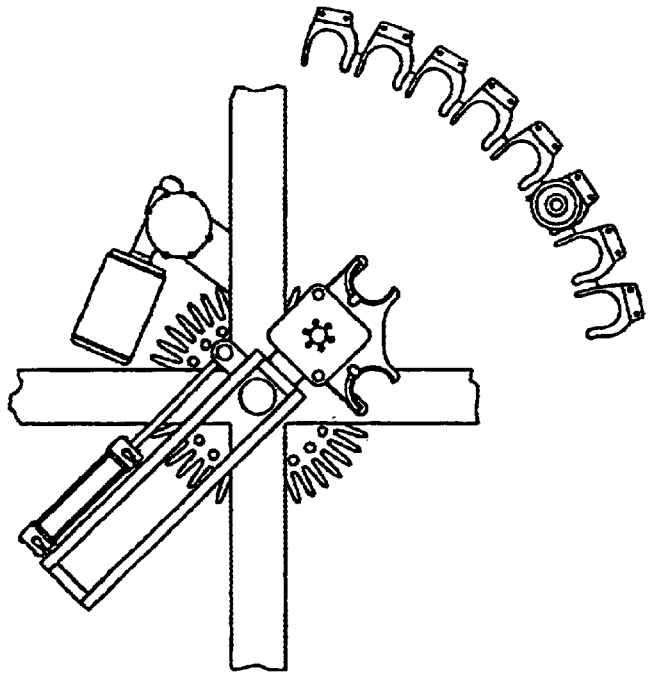
FIGS. 6a & 6b are partially enlarged top views of the movable arm activated tool changer showing progressively a sequence of events in which the movable arm moves from the movable arm-waiting position to the tool-gripping position according to the present invention.
Figure 6B:
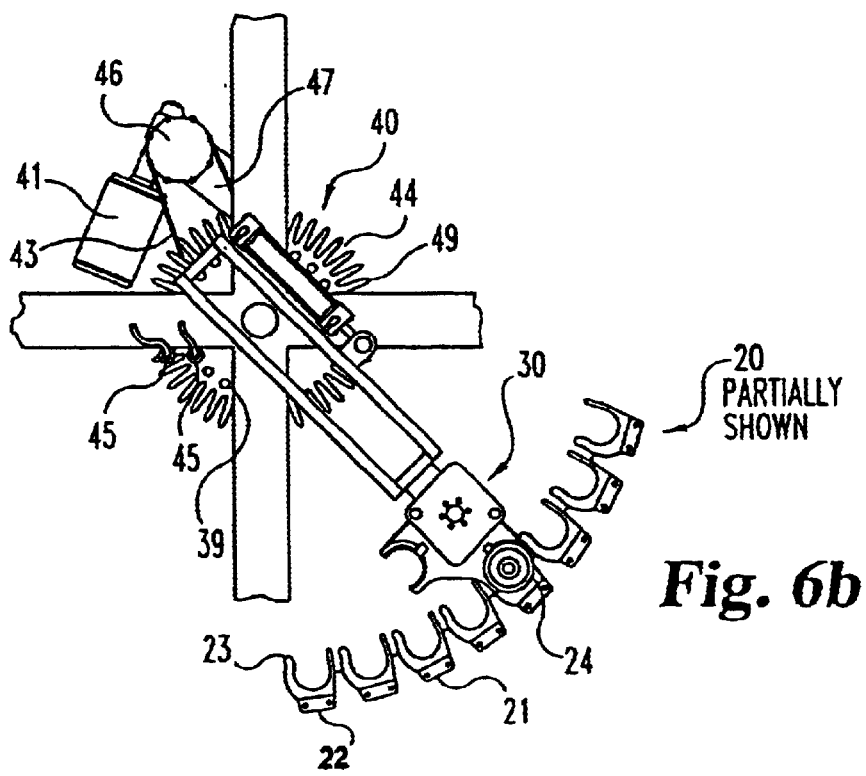

As shown in FIGS. 6a & 6b, gear wheel 44 has a plurality of teeth 49 at the outside diameter of the gear wheel 44. There is clearance between each tooth 49 and teeth 49 are generally pointed outward. The number of teeth 49 on gear wheel 44 may be corresponding to the number of locations 21 on the tool rack 20. Sensor 45 is attached to bottom of tool changer 80. With algorithmic input from the controller from machining center 70, sensor 45 is used to locate a particular tool on tool rack 20. Algorithmic input is determined by sensor 45 in reference to the position of movable arm 30 with respect to tool 24 on locations 21 and teeth 49 of gear wheel 44. For configurations having more tool positions than the number of teeth 49, holes 39 in the gear wheel 44, or other physical indicia, may be used with one or more additional sensor(s) to have the calculation based on input from two or more sensors. When the machining center 70 is at a tool change sequence, motor 41 starts to rotate its shaft, which in turn rotates its pulley 42 on adapter 46. Pulley 42 then rotates belt 43 which then rotates pulley 48 of gear wheel 44 and turns gear wheel 44 to a determined position. Sensor 45 is calibrated so that the location of tooth 49 on gear wheel 44 is corresponding to a particular tool at location 21 on tool rack 20. Movement of gear wheel 44 to a position corresponding to a particular gear tooth 49 causes arm 30 to be moved to the area of the desired tool, and after movement to the area, a pin (not shown) may be dropped into the selected gear tooth space to urge arm 30 into the exact location for removal of the selected tool.

Movable arm 30 is associated with vertical mechanism 50 as shown in FIGS. 4 & 5. Vertical mechanism 50 includes a vertical shaft 51 which is generally disposed in a central position within tool rack 20. Cylinder 52 is disposed in a general parallel orientation relative to vertical shaft 51, and has rod 53 which is operably connected to arm 30 through end 56. Arm 30 is slidingly mounted on vertical shaft 51 so that when rod 53 is extended or retracted by cylinder 52, arm 30 is displaced upon shaft 51 by the corresponding distance that rod 53 is displaced. In a second embodiment shown in FIG. 14, cylinder 52 works in association with second cylinder 54 and second rod 55 such that rod 53 is displaced a certain distance through the operation of cylinder 52 to allow arm 30 to remove a tool from the tool rack and rod 53 may be displaced a second, further distance through the operation of cylinders 52 and 54 and rod 55 to allow arm 30 to place tool 24 in spindle 72. Second cylinder 54 is located below cylinder 52 and is attached to a column (not shown) by rod 55 and end 56. When it is desired to extend arm 30 to spindle 72, cylinder 52 actuates rod 53 displacing arm 30 and cylinder 54 actuates rod 55, which forces cylinders 52 and 54 to be displaced rather than displacing a fixed column, thus displacing arm 30 a distance corresponding to the displacements of rods 53 and 55 or the distance to spindle 72. Shaft 51 may also have sensors (not shown) on either end to detect the approach of arm 30, which may be used by the machine tool controller to sense the position of, or limit the movement of, arm 30.

Tool changer 80 is associated with horizontal mechanism 60 as shown in FIGS. 4 & 5. Horizontal mechanism 60 includes linear track 61 pivoting about vertical shaft 51. Linear track 61 is also attached to two vertical columns 65 which are located on each side of vertical shaft 51. Two vertical columns 65 help to stabilize linear track 61 along the vertical moment of movable arm 30. Linear track 61 consists of assembly 63 which is horizontally slotted on its side. Assembly 63 is sandwiched between plate assembly 64. Plate assembly 64 consists of one plate on each side of linear track 61. Movable arm 30 is fastened to the inner face of each side of plate assembly 64 as shown in FIG. 4. Therefore, movable arm 30 and plate assembly 64 move simultaneously along the horizontal slot of linear track 61.

As shown FIG. 4, tool changer 80 includes access door 82, which is located on one side of tool changer 80, for manually accessing tools in tool rack 20. Access door 82 is located proximate one of plurality of locations 21 and is sized to allow for manual access to one of plurality of locations 21. Access door 82 may include an additional location 21 for holding a tool. Whenever access door 82 is closed its additional location 21 would be positioned along with locations 21 of tool rack 20. For providing access to spindle 72, cylinder actuated door 83 is attached to one side of tool changer 80. When tool changer 80 is installed inside machining center 70, cylinder actuated door 83 keeps debris from machining center 70 from entering into the compartment of tool changer 80 when cylinder actuated door 83 is closed. Cylinder actuated door 83 may be opened and closed by cylinder 84.

Figure 10:
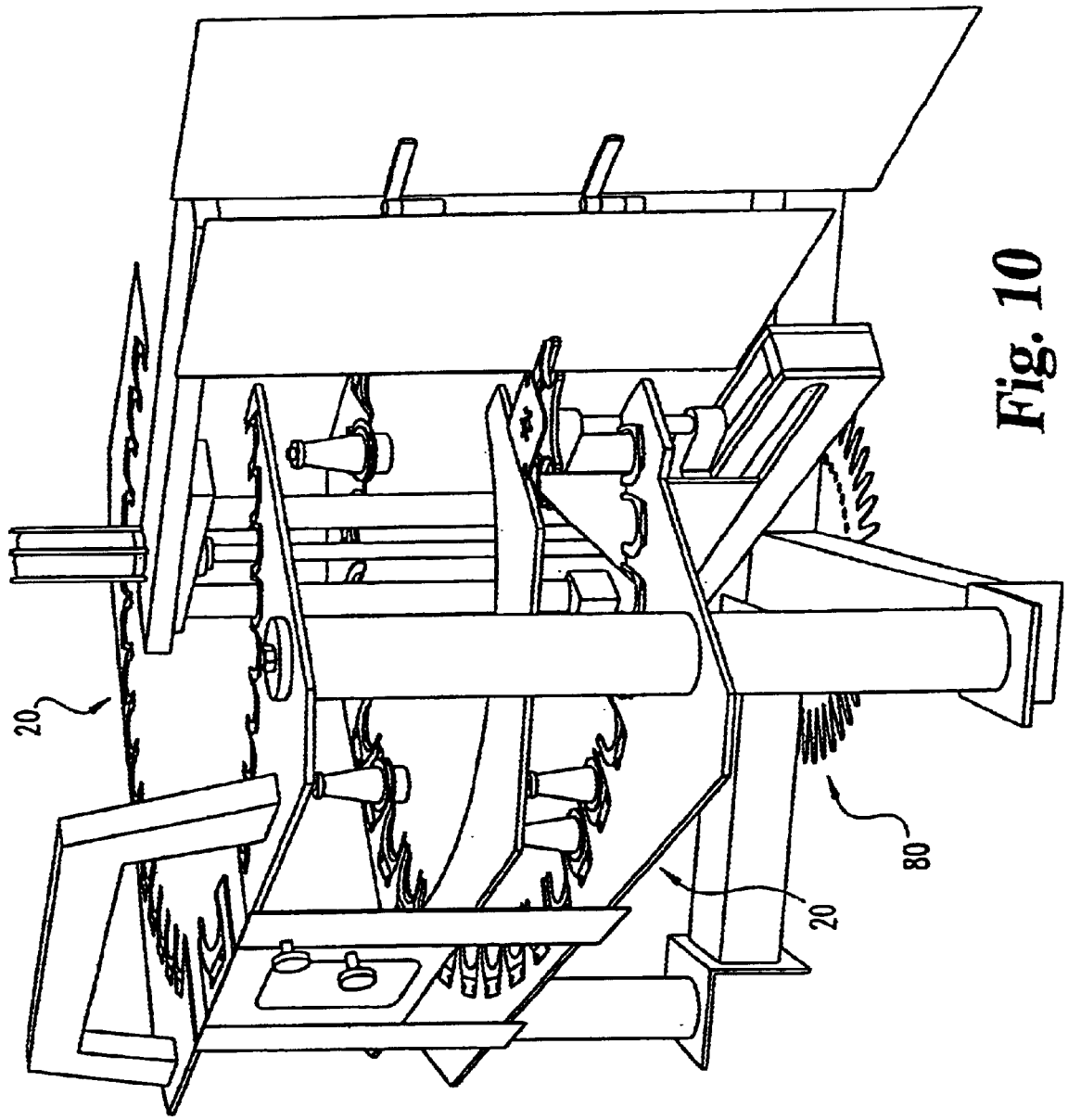
FIG. 10 is a perspective view of the arm activated tool changer with two tool racks according to the present invention.

In another embodiment, tool changer 80 may include a plurality of tool racks 20. Tool racks 20 may be arranged so that each tool rack 20 is on top of other with clearance between them. FIG. 10 shows tool changer 80 with two tool racks 20. Second tool rack 20 may be installed on top of tool changer 80 with clearance between bottom rack and top rack. The amount of clearance is dependent on the size and shape of tools being stored in tool rack 20.

Figure 7:
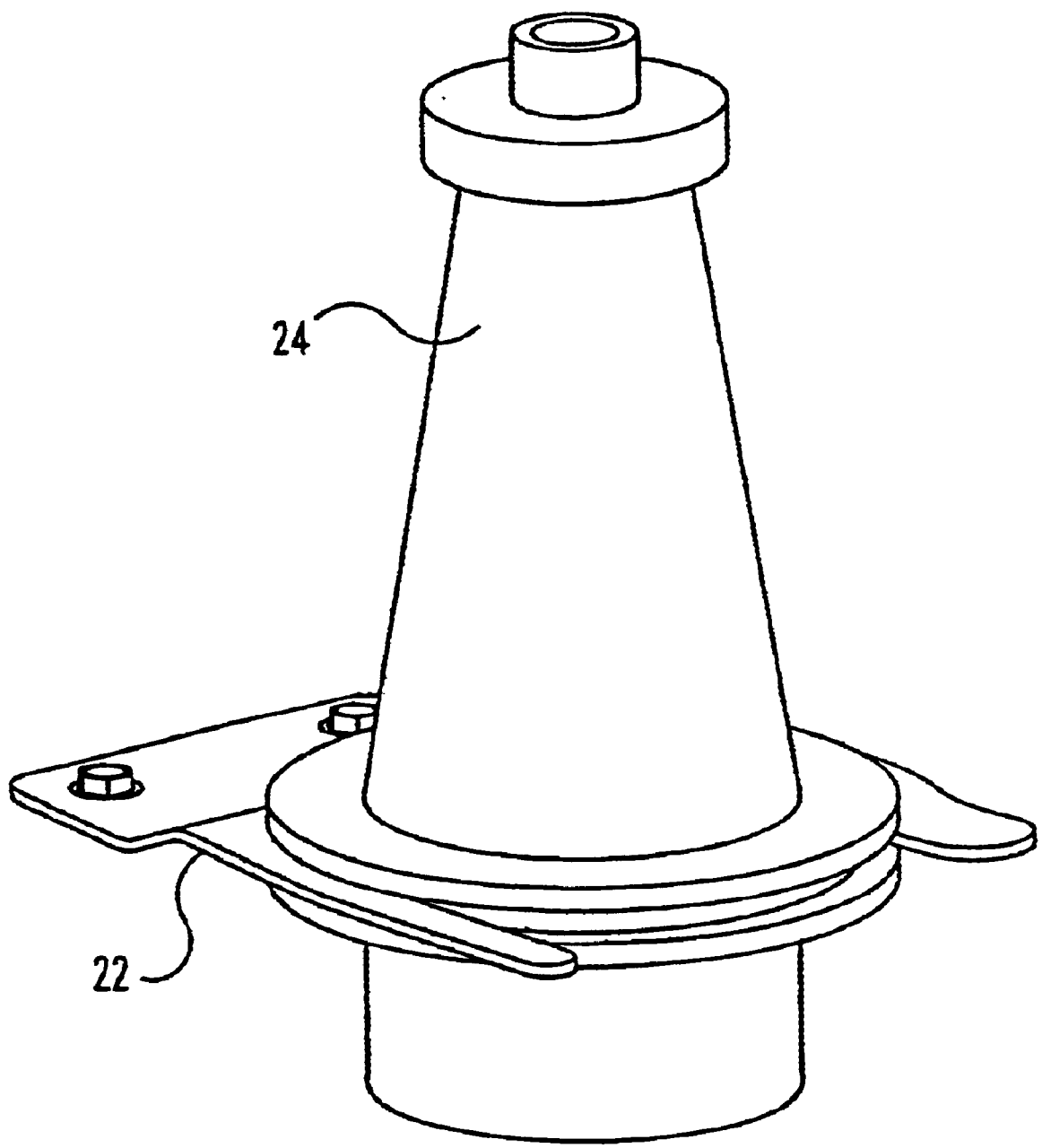
FIG. 7 is a perspective view of a fork with a tool between the two prongs of the fork according to the present invention.
Figure 8:
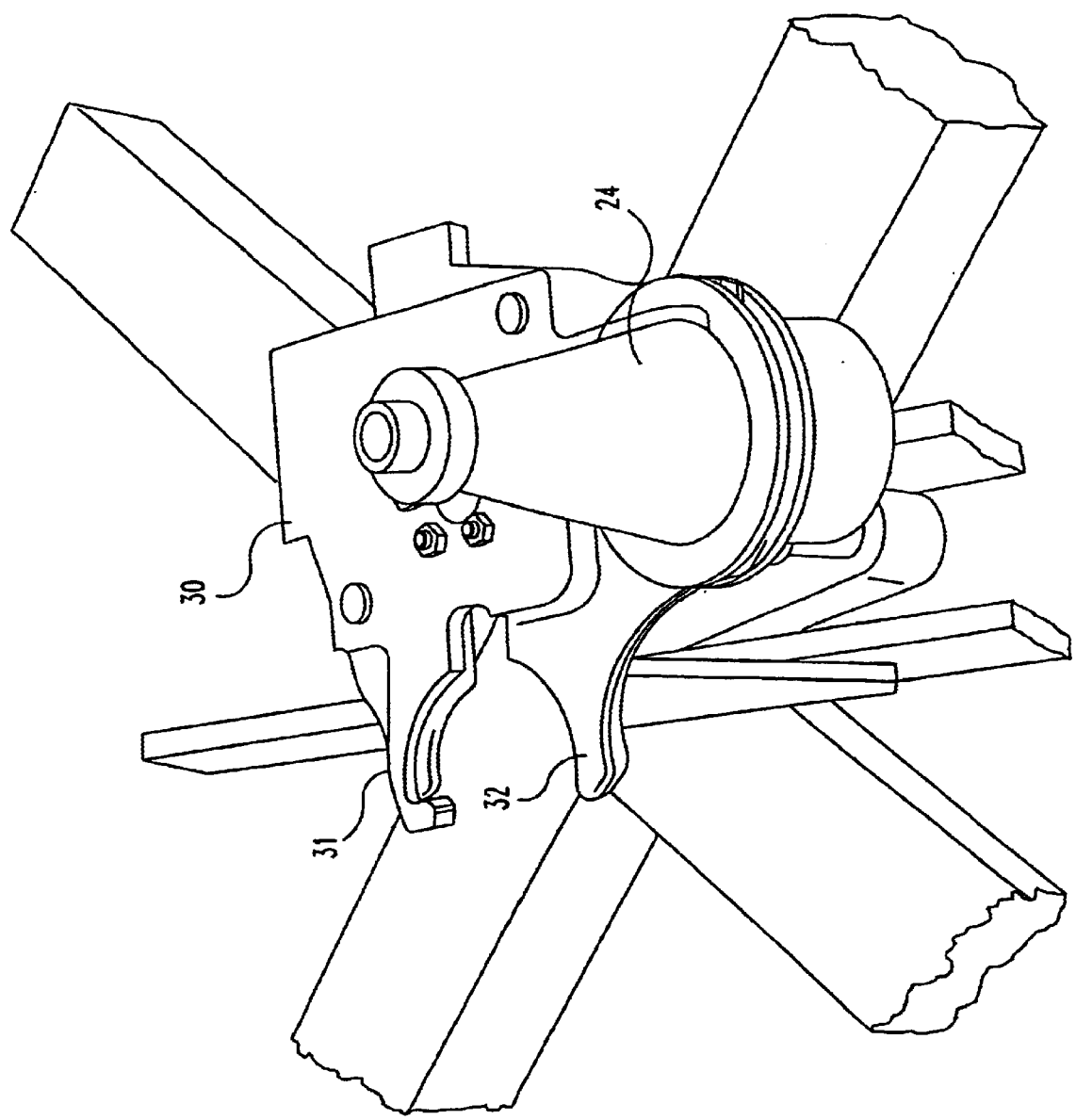
FIG. 8 is a perspective view of the movable arm with a tool in one of its grippers according to the present invention.
Figure 9:
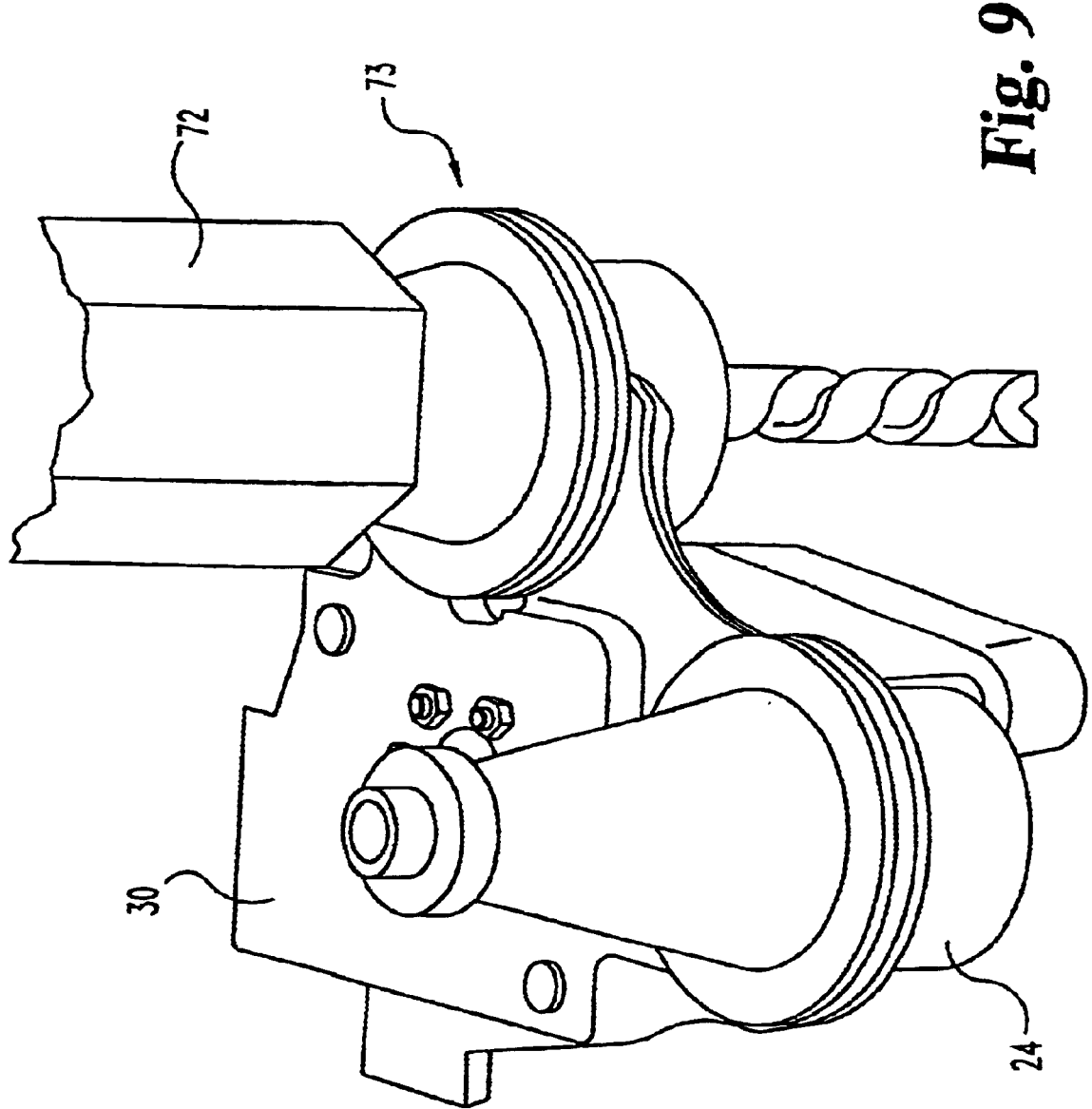
FIG. 9 is a perspective view of movable arm with a tool in the process of exchanging that tool with the tool in the spindle in machining center according to the present invention.

In a first embodiment, movable arm 30 is moved to a predetermined new tool 24 on the tool rack 20 from a waiting or idling position of movable arm 30 to a tool-gripping position as shown in FIGS. 6a & 6b. New tool 24 is to replace working tool 73 in spindle 72 of machining center 70. Movable arm 30 is rotated and extended so one of its grippers 31 with fingers 32 are on the sides of tool 24. Fingers 32 then collapse on tool 24 and firmly grip tool 24 as shown in FIGS. 7 & 8. Movable arm 30 is then retracted, rotated, and translated toward the location of spindle 72 in the machining center 70. At the same time, door 83 is opened so movable arm 30 can extend gripper 31, which does not have a tool, toward tool 73 in spindle 72. Movable arm 30 is stopped when fingers 32 of gripper 31 are on the sides of working tool 73 in spindle 72. Fingers 32 then collapse and firmly grip on the tool 73. Movable arm 30 then translates downward in order to extract working tool 73 from spindle 72. Movable arm 30 next rotates so gripper 31 with new tool 24 is directly underneath spindle 72. New tool 24 is then translated upward by movable arm 30 in order to insert new tool 24 into spindle 72. Gripper 31 is released and fingers 32 are no longer grip new tool 24. FIG. 9 presents tool changing steps which are discussed above. Movable arm 30 retracts to the waiting position and actuated door 83 is closed between tool changer 80 and machining center 70.

Figure 14:
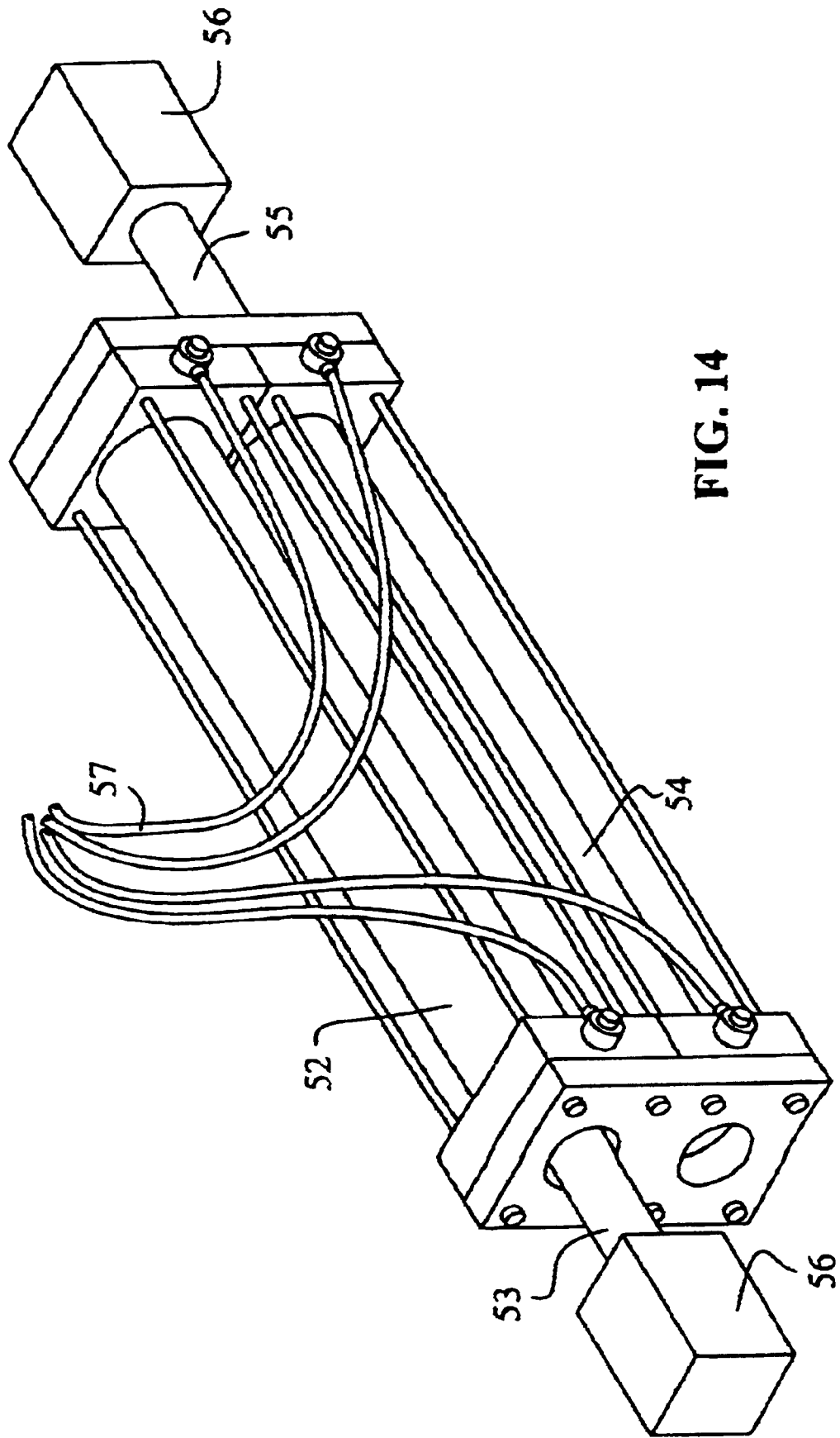
FIG. 14 is a perspective view of the double cylinder mechanism for movement of the rotatable arm.
Figure 15:
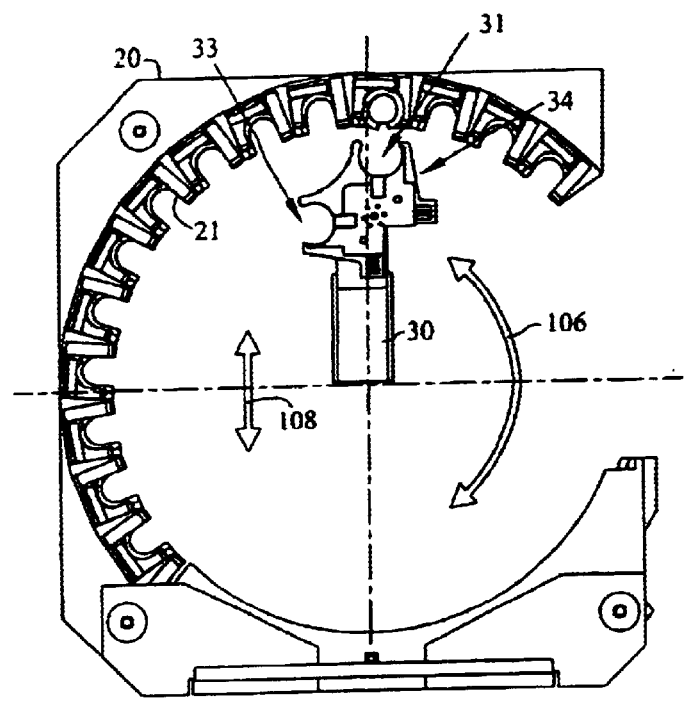
FIGS. 15–20 are operational views of the tool change process.
Figure 16:
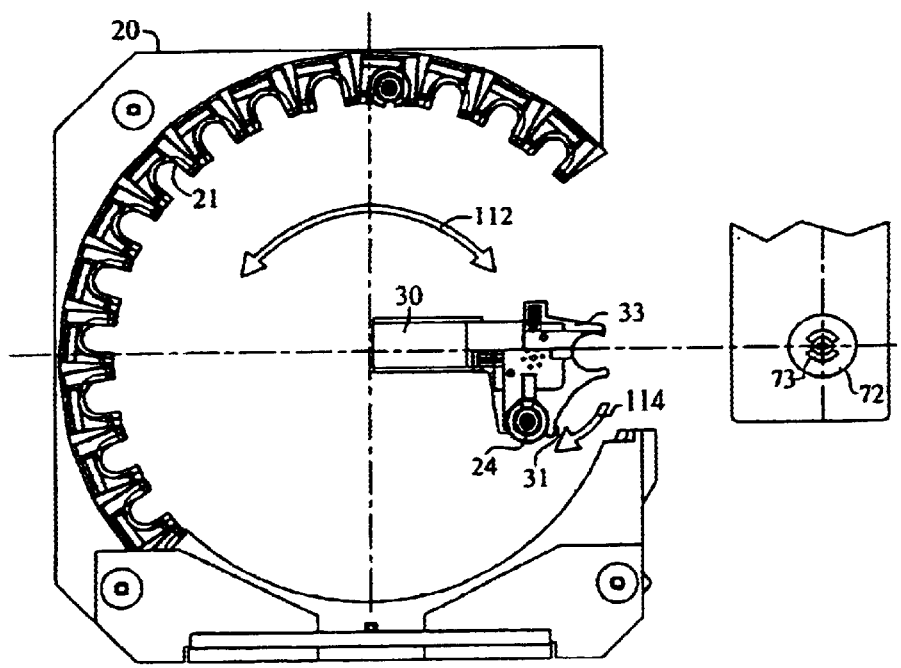

The second embodiment, or more specifically, the embodiment utilizing sheet metal clip 22 and cam 34 provides the following tool change method. Referring to FIGS. 15–20, the operation of the tool changer and its arm will be described. As shown in FIG. 15, arm 30 is rotated and extended, as indicated by arrows 106 and 108, to a selected tool position 21 in tool rack 20 by the operation of cylinder 52 (FIG. 14). Grippers 31 and 33 are positioned such that load gripper 31 interface with tool rack 20, specifically selected tool location 21. Once arm 30 is fully extended to tool rack 20, spring loaded fingers 32 grasp selected tool 24. As fingers 32 close onto tool 24, cam 34 located on load gripper 31 lifts bent prong 23B of sheet metal clip 22 surrounding tool 24, thereby unlocking tool 24. Upon unlocking tool 24, arm 30 retracts and tool 24 is removed from tool rack 20. With reference to FIG. 16, arm 30 is rotated into alignment with machine tool spindle 72, as indicated by arrow 112, and grippers 31 and 33 are rotated 90° (arrow 114) such that unload gripper 33 faces machine tool spindle 72. Machine tool spindle 72 then moves downward into its load position in which spindle 72 is capable of receiving tool 24.

Figure 17:
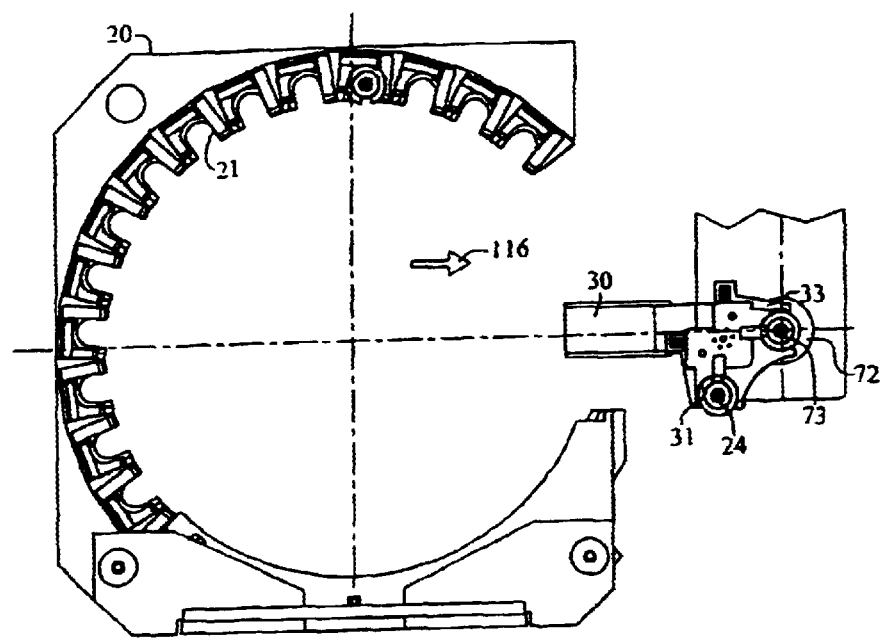
Figure 18:
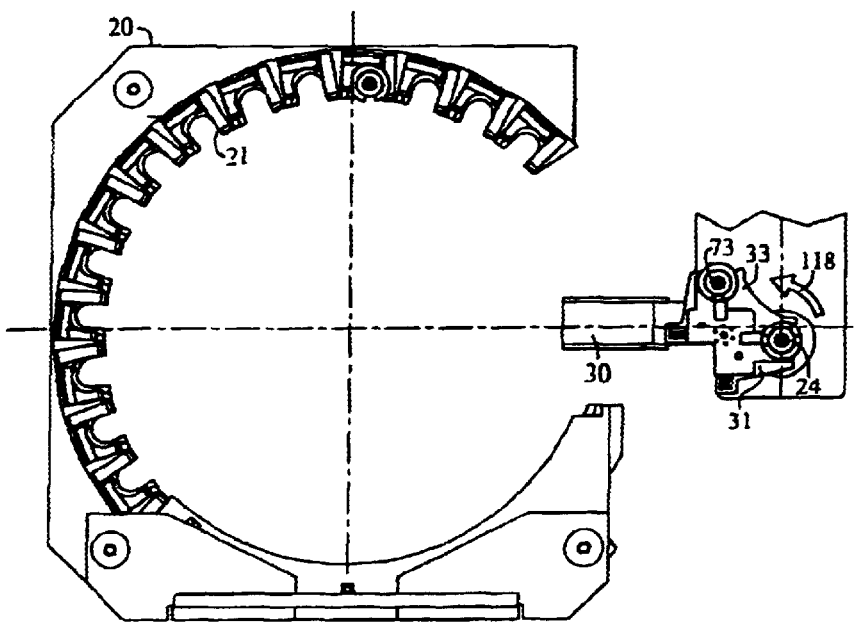

With reference to FIG. 17, arm 30 is extended to spindle 72, as indicated by arrow 116, through the operation of cylinder 52 and second cylinder 54. Since the grippers were rotated to place unload gripper 33 into position to interface with spindle 72, an empty pair of fingers 32 are available for receipt of tool 73, which is already in the spindle. Tool 73 is grasped by fingers 32 of unload gripper 33 and spindle collett 68 (FIG. 3), located at the tip of spindle 72, is released. After collett 68 is released, either arm 30 is lowered or spindle 72 raised depending upon the type of machine associated with the tool changer. Upon movement of spindle 72 or arm 30, the "old" tool, or tool 73, is removed from spindle 72. After removal, the grippers are again rotated 90°, in the direction opposite of the previous rotation, and as indicated by arrow 118 thereby placing load gripper having the "new" tool, or tool 24, under spindle 72. Spindle 72 is then lowered or arm 30 is raised, dependent upon the type of machine, such that tool 24 is placed proximate spindle 72 whereupon spindle collett 68 (FIG. 3) grasps tool 24 in spindle 72 for operation of the machine using the "new" tool.

Figure 19:
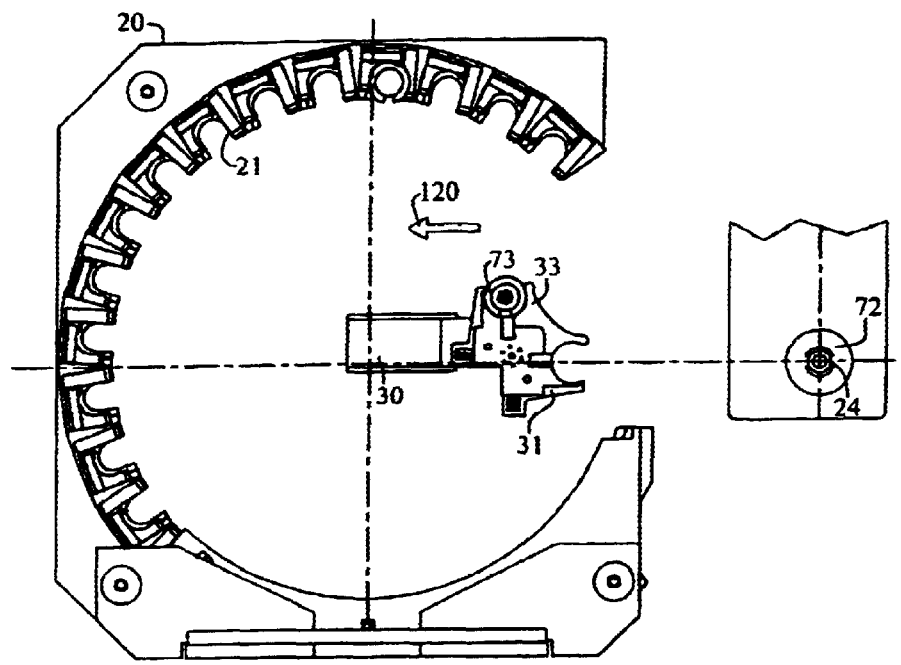
Figure 20:
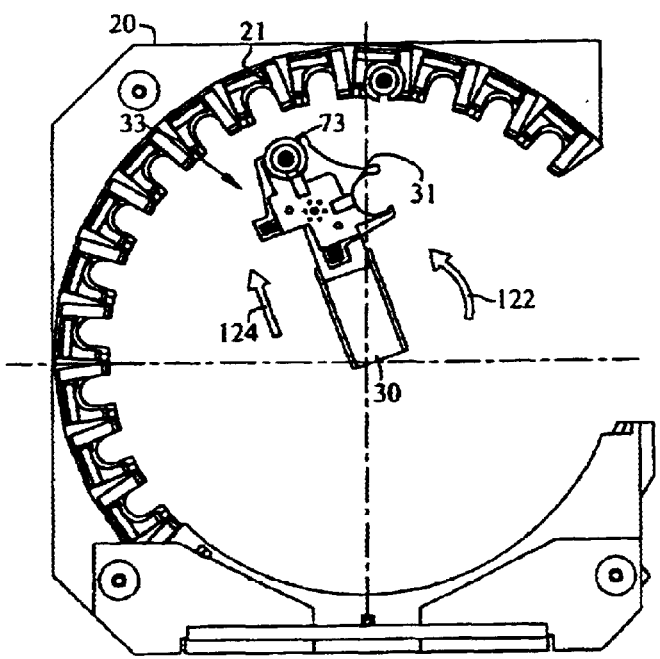

Referring now to FIG. 19, after placement of tool 24 in spindle 72, arm 30 is retracted, in the direction of arrow 120, via operation of cylinders 52 and 54. The machine may then continue the machining process using the "new" tool, or tool 24. Arm 30 is now within the area of tool rack 20 and may be rotated to an empty tool location 21, as indicated by arrow 122 and in FIG. 20, in the tool rack for the replacement of tool 73. Unload gripper 33, which has "old" tool 73 therein is 90° out of alignment with an empty tool location 21, thus grippers 31 and 33 are rotated 90° such that unload gripper 33 faces tool rack locations 21. Arm 30 is then extended, in the direction of arrow 124, to the selected empty tool rack location 21 wherein tool 73 may be placed. Sheet metal clip 22 latches onto tool 73 and securely locks tool 73 in location 21 since cam 34 or gripper 33 is not near sheet metal clip 22 to unlock the clip. Arm 30 is then retracted such that tool 73 remains in its tool location and arm 30 returns to a position from which it may be moved to retrieve another tool and begin the tool change process again.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. A tool changer for removal and installation of tools in a machining center having a spindle for holding a tool, said tool changer comprising:
   a tool rack having a plurality of locations for holding tools, each of said plurality of locations having a clip for holding a tool, each said clip having two arms, an arm on a first side of said clip having an inclined surface; and
   a rotatable arm movable between the spindle and said plurality of locations, said rotatable arm including at least two grippers, each said gripper defining at least one cam surface, said cam surface structured and arranged to engage said inclined surface of said clip to allow for at least one of insertion and removal of a tool in said clip.

2. The tool changer of claim 1, wherein a tool rests on said clip, said inclined surface snapping to lockingly engage the tool in position.

3. The tool changer of claim 1, wherein said rotatable arm further comprises a first cylinder and a second cylinder.

4. The tool changer of claim 3, wherein said first cylinder moves said rotatable arm to a said tool location.

5. The tool changer of claim 3, wherein said first cylinder and said second cylinder move said rotatable arm to the spindle.

6. The tool changer of claim 1, wherein each said gripper further includes a pair of movable fingers, said fingers having a first position wherein a tool is not held between said fingers and a second position wherein a tool is held between said fingers.

7. The tool changer of claim 6, wherein each said gripper further comprises a spring mechanism, said spring mechanism biasing said fingers into said first position when a tool is not held, said spring mechanism moving said fingers toward said first position when said fingers are in said second position such that a tool is securely held within said gripper.

8. A machining center comprising:
   a machine having a spindle, said spindle holding one of a plurality of tools; and
   a tool changer for removal and installation of said plurality of tools in said machine, said tool changer comprising:
      a tool rack having a plurality of locations, each said location holding a said tool, and having a clip for holding a said tool, each said clip having two arms, an arm on a first side of said clip having an inclined surface; and
      a rotatable arm movable between said spindle and said plurality of locations, said rotatable arm including at least two grippers, each said gripper defining at least one cam surface, said cam surface structured and arranged to engage said inclined surface of said clip to allow for at least one of insertion and removal of a tool in said clip.

9. The machining center of claim 8, wherein said machine is a lathe.

10. The machining center of claim 8, wherein said rotatable arm further comprises a first cylinder and a second cylinder.

11. The machining center of claim 10, wherein said first cylinder moves said rotatable arm to a said tool location.

12. The machining center of claim 10, wherein said first cylinder and said second cylinder move said rotatable arm to said spindle.

13. The machining center of claim 8 further comprising a frame having an access door for manually accessing tools in said tool rack, said access door including at least one said location for holding a said tool, said location being part of said tool rack, said access door location including a said clip.

14. The machining center of claim 13, wherein said clip at said access door has said inclined surface oppositely disposed relative to the other said clips and said cam surface on one said gripper is oppositely disposed relative to said cam surface on the other said gripper.

15. The machining center of claim 8, wherein each said gripper further includes a pair of movable fingers, said fingers having a first position wherein a said tool is not held between said fingers and a second position wherein a said tool is held between said fingers.

16. The machining center of claim 15, wherein each said gripper further comprises a spring mechanism, said spring mechanism biasing said fingers into said first position when a said tool is not held, and said spring mechanism moving said fingers toward said first position when said fingers are in said second position such that a said tool is securely held within said gripper.

17. The machining center of claim 8, wherein each said clip further comprises a key and each said tool further comprises a keyway therein, said clip key lockingly engaging said keyway when a said tool is held by a said clip at a said tool location.

18. The machining center of claim 17, wherein each said gripper further comprises a key, said gripper key lockingly engaging said keyway when said tool is grasped by a said gripper.

19. A method of changing tools in a machining center having a tool changer with a rotatable arm for removing and placing tools in a spindle of a machine or a tool rack having locations for holding tools, the method comprising:
   providing at least two grippers on the rotatable arm, the grippers defining a cam surface;
   providing a tool holding device at each location on the tool rack, the tool holding device including two arms with one of the arms having an inclined surface;
   moving one of the grippers into engagement with the tool holding device;
   engaging the tool holding device arm having the inclined surface with the cam surface of the gripper;
   unlocking the tool holding device; and
   disengaging the tool holding device arm having the inclined surface from the cam surface of the gripper.

20. The method of claim 19 further comprising prior to disengaging the tool holder arm from the cam surface, one of removing a tool from the tool holder and inserting a tool into the tool holder.

* * * * *